J. BAUMFALK
INVENTORS T. P. MC GUINNESS
R. C. NANCE
BY Donald M Duft
ATTORNEY

Jan. 10, 1967 J. BAUMFALK ETAL 3,297,828
OPERATOR POSITION CONTROL EQUIPMENT FOR SERVING CALLS ON AN OVERLAP BASIS
Filed Oct. 23, 1963 6 Sheets-Sheet 2
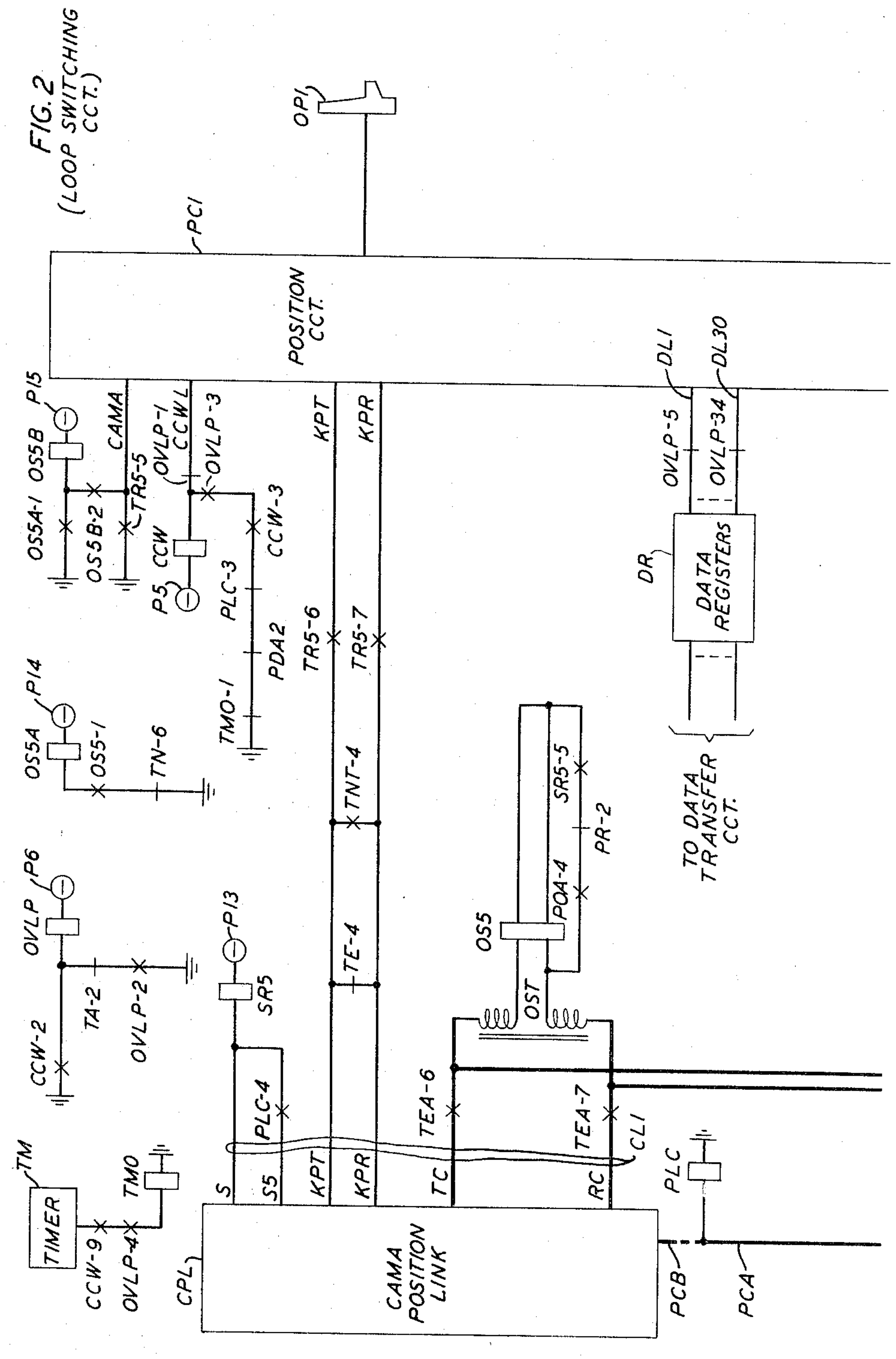
FIG. 2 (LOOP SWITCHING CCT.)

Jan. 10, 1967 J. BAUMFALK ET AL 3,297,828

OPERATOR POSITION CONTROL EQUIPMENT FOR SERVING CALLS ON AN OVERLAP BASIS

Filed Oct. 23, 1963 6 Sheets-Sheet 4

FIG. 4 (LOOP ACCESS CONTROL CCT.)

(LOOP HOLDING & MEMORY CONTROL CCTS.)

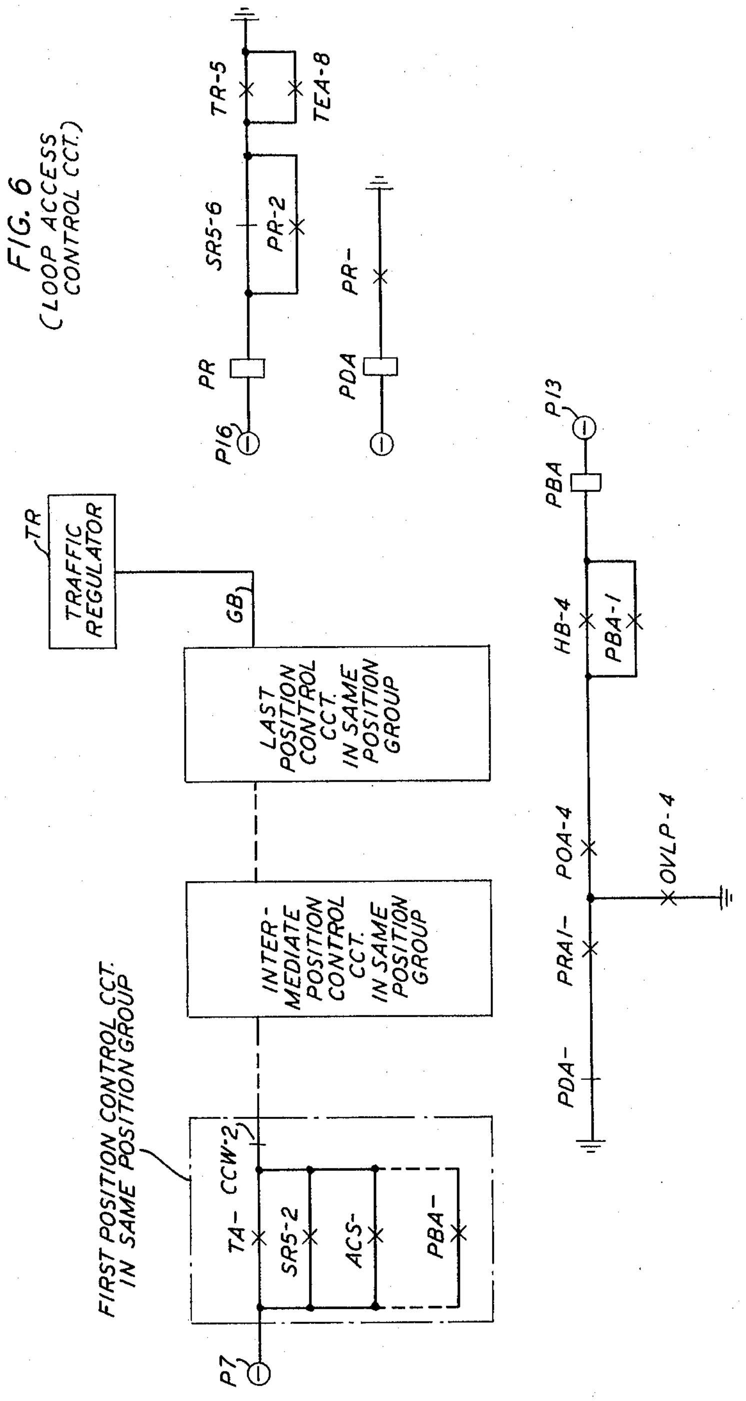
FIG. 6 (LOOP ACCESS CONTROL CCT.)

United States Patent Office 3,297,828
Patented Jan. 10, 1967

3,297,828

OPERATOR POSITION CONTROL EQUIPMENT FOR SERVING CALLS ON AN OVERLAP BASIS

John Baumfalk, Allenhurst, N.J., Thomas P. McGuinness, Bronx, N.Y., and Robert C. Nance, Columbus, Ohio, assignors to Bell Telephone Laboratories, Incorporated, New York, N.Y., a corporation of New York Filed Oct. 23, 1963, Ser. No. 318,407
16 Claims. (Cl. 179—27)

This invention relates to switching systems and particularly to equipment utilized in telephone systems for improving the quality of customer service and simplifying the tasks performed by an operator on calls which she serves concurrently on a so-called overlap basis. The present invention further relates to equipment which reduces both the number of manual operations performed by an operator in serving calls on an overlap basis and the amount of time required for switching the operator position facilities between the telephone circuits used for serving the overlapping calls.

A telephone operator often is delayed from completing the serving of a customer call because either all circuits to the desired destination are busy or the desired called party is not immediately available to answer the call. In such instances, it has been a recommended practice that the operator inform the customer of the reason for the delay and then remain associated with the call to provide further assistance to the caller if he desires to wait.

In situations where both the customer and an operator have been required to wait a considerable time before a delayed call is completed, the foregoing practice has proven inefficient and therefore undesirable from a traffic-serving standpoint. To alleviate the inefficient utilization of operator time, telephone companies have provided a procedure whereby each of their operators serves a call, referred to as an overlap call, on an overlap basis with the delayed call when she determines that a prolonged delay will be encountered on the latter call. According to this procedure, when a operator expects to be delayed a considerable time from completing the serving of a call, she may proceed to place a temporary hold condition on the circuits serving the delayed call while she serves another call on an overlap basis. Thereafter, when she has served the overlap call, the operator reassociates her telephone facilities with the delayed call circuit and again attempts to complete the servicing of that call.

A disadvantage of the foregoing procedure for serving calls on an overlap basis is that the customer whose call has been delayed is often obliged to wait far longer for the completion of his call than he would if the operator had not served an overlapping call. This wait has heretofore been occasioned by the fact that the operator had to perform many manual operations with cords, keys and other switching apparatus in order to serve calls on an overlap basis. In addition, the operator is usually required to write on a ticket the details concerning the delayed call so that she may again reassociate her telephone facilities with the proper delayed call circuit and furnish the needed assistance as quickly as possible after she has completed serving the other call on an overlap basis.

In view of the foregoing, it may be appreciated that a a need exists for a means to lessen the number of manual operations performed by an operator in serving overlapping calls and to reduce the time required for switching the operator telephone facilities between the different circuits utilized for serving calls on an overlap basis so that the customer whose call has been delayed can obtain faster and more efficient service.

Accordingly, it is a general object of our invention to provide a more efficient procedure and facilities for serving calls on an overlap basis.

It is another object of this invention to provide switching equipment which lessens the labor content of the operator's job on overlapping calls and which particularly reduces the number of manual operations performed by an operator in serving such calls.

Another object of the present invention is to provide switching equipment which expedites the serving of overlapping calls by an operator and which reduces the waiting time of the customer whose call has been delayed.

These and other objects are obtained in accordance with an exemplary embodiment of our invention, wherein switching equipment is provided which may be activated by the momentary depression of a key at an operator position, when the operator encounters a delay in serving a call. This activated equipment automatically effects the temporary disconnection of the delayed call from the operator telephone facilities, the connection of her telephone to an overlap call requiring operator assistance and, after the latter call has been served, the reconnection of her telephone with the delayed call.

According to the exemplary embodiment, an operator is enabled to serve a short work-time call on an overlap basis with a longer work-time call, such as a person-to-person call, when she encounters a delay in completing the latter call. These short work-time calls are calls on which the operator is only required to request and receive orally from the caller the calling telephone number, and then to key that number into common control equipment of the telephone system. Such a short work-time call is known in the art as a CAMA (Centralized Automatic Message Accounting) call which is presently served by a tandem telephone system such as is disclosed in the R. N. Breed-O. Cesareo-C. E. Germanton-R. W. Roberts-L. A. Weber-C. A. Wingardner Patent 2,848,543, granted Aug. 19, 1958. The exemplary embodiment of our invention is disclosed as part of a crossbar tandem system since the invention will initially find its greatest commercial utility in such a system. However, it is to be understood that the principles of the present invention are not limited to use with a crossbar tandem system and instead may, if desired, be used with local and toll offices. In addition, the present invention is not limited solely to serving short work-time CAMA calls on an overlap basis, but may be used for serving a majority of the telephone calls presently placed through telephone systems.

In the exemplary embodiment of our invention, a special service call, such as a person-to-person call, is connected to the operator position for service over one of a plurality of operator position loop circuits. Upon receiving such a call and ascertaining that its completion will be delayed, the operator depresses a key at her position for activating switching equipment which registers automatically the identity of the loop circuit serving the delayed call and places a temporary hold condition on that circuit. At the same time, the equipment disconnects the operator telephone facilities from the held circuit and connects it to another loop circuit which is used exclusively for serving CAMA calls. The CAMA loop circuit is then conditioned for receiving a CAMA call. After such a call has been extended to the position and served by the operator, the subject equipment automatically disconnects the operator telephone from the CAMA loop circuit and utilizes the registered loop identity for automatically reconnecting the position with the held loop.

It is a feature of our invention that first, intermediate and last communication channels be individually connected to an operator position in response to service requests thereon, that a hold condition be placed on the channel connected to the position when a delay is encountered in serving the request thereon, that the connection to the position be temporarily transferred from the held channel to another of the channels having a service request thereon, and that the held channel be automatically reconnected to the position after the request on the other channel has been served.

Another feature of the present invention is the provision of a connector responsive to the receipt of a service request on any one of a plurality of communication channels for individually connecting that one channel to an operator position for service, apparatus under control of an operator for applying a hold condition to the latter channel, circuitry activated by the applying apparatus for registering the identity of the held channel, facilities operated by the registering circuitry for disconnecting the held channel from the position, another communication channel for receiving special service requests, circuitry controlled by the applying apparatus and responsive to the receipt of a special service request on the other channel for connecting that channel to the operator position, and circuitry in the connector activated by the registering circuitry for automatically reconnecting the held channel to the position after the special service request has been served.

A further feature of this invention, directly related to the immediately preceding one, is the provision of timing facilities activated by the applying apparatus for generating a timed interval within which a special service request is to be received one the other channel, and apparatus controllable by the timing facilities for activating the reconnecting circuitry at the end of the timed interval automatically to reconnect the held channel to the operator position.

Yet another feature of our invention is the provision in a telephone system of a group of communication loops for serving long work-time calls, a special communication loop for serving relatively short work-time calls, and an operator position control circuit for selectively coupling any one of the loops to an operator position for the servicing of any of the calls thereon. This control circuit further comprises apparatus activated under the control of an operator for placing a hold condition on any one of the loops of the group connected to the operator position when a delay is encountered in serving the call on that loop, circuitry activated by the placing apparatus for registering the identity of the held loop, circuitry controlled by the registering circuitry for decoupling the held loop from the position, auxiliary apparatus thereafter operable by a call on the special loop for coupling that loop to the position, apparatus for releasing the auxiliary apparatus after the call on the special loop has been served to decouple the latter loop from the position, and means jointly controlled by the registering and decoupling circuitry and responsive to the release of the auxiliary apparatus for automatically again coupling the held loop to the position.

Another feature of our invention is the provision of opeartor position equipment including a plurality of position loops for receiving incoming calls, as well as, an operator position and position control facilities for serving the received calls. The control facilities comprise: a loop switching circuit operable upon the receipt of a call on any one of the position loops for connecting that loop individually to the position, circuitry for holding the call on the calling loop when a delay is encountered in serving that call, and a memory circuit activated by the holding circuitry for storing the identity of the held loop. The aforementioned switching circuit is releasable upon the activation of the memory circuit to disconnect the held loop from the position. In addition, the position equipment includes an additional position loop for serving CAMA calls. The position control faciltiies also comprise circuitry for enabling a special service call to be received on the special loop during the delay period, and auxiliary circuitry in the loop switching circuit which is activated upon the receipt of a call on the special loop for connecting that loop to the position for service. Advantageously, the control facilities further comprise circuitry automatically activated after the latter call has been served by an operator for releasing the auxiliary circuitry to disconnect the special loop from the position and circuitry thereafter jointly controlled by the releasing circuitry and memory circuitry for automatically operating the loop switching circuit again to connect the held loop to the position.

Still another feature is that the loop switching circuit comprises a plurality of connector relays, each of these relays being individually associated with one of the position loops including the special loop and operable for connecting the associated loop to the operator position; and a group of control relays, each of these relays being individually associated with one of the loops including the special loop and responsive to a call on the associated loop for operating the associated connector relay to connect that loop to the position.

It is another feature that the position control facilities include a tone geneartor for generating a tone signal, apparatus operable under control of any of the control relays for coupling the generated tone signal to the position, circuitry activated by the coupling apparatus for determining the time period for which the tone signal is coupled to the position, and apparatus activated by the determining circuitry for decoupling the tone signal from the position and for cooperating with the connector relays to connect any one of the loops to the position.

Another feature is that the memory circuit comprises a plurality of memory relays, each of these relays being individually associated with one of the plurality of position loops and operative under joint control of the call holding circuitry and the connector and control relays associated with the last-mentioned one of the loops for storing the identity of that loop.

Yet another feature is that the position control facilities further comprise disconnect relay means responsive to the operation of any one of the memory relays for releasing the operated connector relay associated with the held loop and thereby causing the disconnection of the held loop from the position. This disconnect relay means includes a first relay operative under control of contacts of the memory relays, and a plurality of disconnect relays each of which is individually associated with one of the position loops except the special loop and is operative under the joint control of contacts of the first relay and the connector relay associated with the same loop for releasing the latter relay and thereby causing the disconnection of the last-mentioned loop from the position.

It is another feature that the position control facilities further include position disconnect circuitry activated by the control relay associated with the special loop for effecting the disconnection of that loop from the position after the special service call has been served by the operator, an access relay circuit operative under the joint control of the position disconnect circuitry and the memory, disconnect and connector relays associated with the held loop for effecting the reoperation of the latter relay and thereby the reconnection of the held loop to the position.

A further feature is the provision of a timer activated by the call holding means for generating a timed interval within which a special service call is to be received on the special loop, circuitry for deactivating the timer to cancel further timing after the special service call has been received on the special loop, a timer relay activated by the timer at the end of the timed interval for cooperating with the memory, disconnect and connector relays associated with the held loop for effecting the reoperation of the latter relay and thereby the reconnection of the held loop to the position.

The foregoing objects, features and advantages, as well as others, of this invention may become more apparent from a reading of the following description with reference to the drawing in which:

FIG. 1 shows, in a block diagram, the interrelation of the various equipment elements of the illustrative embodiment, which elements comprise 66 position units, each of which includes a loop switching circuit, a loop access control circuit, loop holding and memory control circuits, data registers and a position circuit, that cooperate with a data transfer circuit and a traffic regulator for interconnecting incoming calls received over position loops from 10 position link connectors and a CAMA position link to any one of 66 operator positions;

FIGS. 2–6, inclusive, show in block and schematic form the essential circuit details of a loop switching circuit, a loop access control circuit, loop holding and memory control circuits, and a position circuit, utilized for connecting incoming calls on an overlap basis from 10 position link connectors and a CAMA position link to an operator position; and FIG. 7 depicts the position in which FIGS. 2–6 should be placed to show the cooperation between the equipment elements.

It is noted that FIGS. 2–6 employ a type of schematic notation referred to as "detached-contact" in which an "X" crossing a line represents a normally open contact of a relay and a bar crossing a line represents a normally closed contact of a relay; "normally" referring to the unoperated condition of a relay. The principles of this type of notation are described in an article entitled "An Improved Detached-Contact-Type Schematic Circuit Drawing" by F. T. Meyer in the September 1955 publication of the American Institute of Electrical Engineers Transactions, Communication and Electronics, vol. 74, pp. 505–513.

Each relay contact is designated in the drawing in a manner which indicates the relay of which it is a part and, as well, uniquely identifies it with respect to the other contacts of the relay. For example, referring to the relay contact SR0–1 shown in the lower middle of FIG. 3, it is noted that the "SR0" portion of the designation indicates that it is controlled by the relay SR0 of FIG. 3 and the "–1" uniquely identifies it with respect to another contact SR0–3 of relay SR0, the latter contact being shown at the middle of FIG. 5.

The equipment illustrative of the principles of the present invention have been designed for incorporation into a tandem telephone system of the type disclosed in the R. B. Curtis patent application Ser. No. 318,275, filed concurrently herewith. It is particularly concerned with the circuitry in the position control circuit depicted by heavy lined block in FIG. 1. The other equipment elements are neither shown nor described in detail herein except where necessary for a complete understanding of the invention. The cited Curtis application (hereinafter referred to simply as Curtis) may be consulted for a complete understanding of the construction and operation of both the position control circuit and the other elements not covered in detail herein. While certain of the circuit details of the traffic regulator TR of FIG. 1 are shown in Curtis, a complete traffic regulator is disclosed in the C. E. Germanton application Ser. No. 318,427, filed concurrently herewith. The CAMA position link CPL of FIGS. 1 and 2 forms a part of the tandem system disclosed in Curtis but it is disclosed in more extensive detail in the aforementioned Breed et al. patent.

GENERAL DESCRIPTION

The general organization of the principal equipment elements of the illustrative embodiment of our invention will now be described with reference to FIG. 1. The crossbar tandem system as disclosed in Curtis is designed to serve several different classes-of-calls, such as person-to-person and other special service calls, such as dial "0" assistance calls and other calls. These calls are extended to the tandem system over incoming trunk circuits (not shown) associated with the position link connectors, such as the links PL0–PL9. It may be seen in FIG. 1 that the position links PL0–PL9 provide the means for interconnecting the incoming trunk circuits (not shown) with operator positions, such as positions OP1–OP66, via position units, such as units PU1–PU66, each of which comprises a position control circuit and a position circuit, such as the circuits PCC1 and PC1.

As is indicated in FIG. 1, each of the position links PL0–PL9 in the presently disclosed embodiment has provision for the connection of a maximum of 50 trunk circuits (not shown) to its input and 198 position loops divided into 66 loop groups of three loops each, connected to its output. Illustrative of the latter arrangement is the provision for the connection of the 50 trunk circuits to the input of the position link PL0 and the connection of the position loops L0–L197 of the loop groups LG1–LG66 to the output of link PL0.

The CAMA position link CPL of FIG. 1 has provision for the connection of a maximum of 40 sender circuits (not shown) to its input and 66 CAMA position loops CL1–CL66 connected to its output.

A group of 66 operator positions is connected to the 10 position link PL0–PL9 and the CAMA position link CPL via individual position circuits and position control circuits as well as the aforementioned position loops L0–L197 and CL1–CL66. Each of the position control circuits, such as circuit PCC1, of the position units PU1–PU66 is individually associated with three loops, such as loops L0–L2, extending to the position links PL0–PL9 and one of the CAMA loops, such as loop CL1, extending to the CAMA position link CPL. Thus, the position links PL0–PL9 and CPL serve to interconnect any one of 500 incoming trunk circuits and 40 senders with any one of 66 position control circuits via 264 position loops.

Each of the 66 operator positions is provided with a position unit, such as unit PU1, which comprises a position control circuit and a position circuit. These circuits, together with the equipment at the operator position, provide four loop circuits whereby an operator may serve the calls. Each of the position control circuits, for example circuit PCC1 of FIG. 1, includes a loop switching circuit LSC for automatically conditioning each of the loops L0–L2 and CL1 for connecting received calls one-by-one through the position circuit PC1 to the operator position OP1. The position control circuit PCC1 also comprises loop holding and memory control circuits LHM which may be activated by an operator when she encounters a delay in completing a call received over one of the loops L0–L2 to register automatically in its memory the indentity of the loop serving the delayed call and to place a temporary hold condition on that loop. The control circuits LHM cooperate with the loop access control circuit LAC to activate the loop switching circuit LSC for disconnecting the position OP1 from the held loop and connecting it to the CAMA loop CL1 in order to serve a CAMA call on an overlap basis. After the latter call has been served, the switching circuit LSC disconnected the position OP1 from loop CL1 and reconnects it automatically to the held loop.

An operator can actively serve only one call at a time in this exemplary embodiment even through three loops, such as loops L0–L2, and a CAMA loop are provided for each position. The operator will normally serve calls received over the loops L0–L2 in preference to CAMA calls. CAMA calls are routed to an operator position either in competition with non-CAMA calls routed to the position over the loops L0–L2 or on a non-competitive basis at the request of an operator when she desires to serve such a call on an overlap basis. At the time that an operator is actively serving a call on one of the four loops, the position link appearances of the remaining three loops will appear busy and no calls will be offered to these loops at that time.

Four loops are provided for each position because, on some calls, the calling loop may be utilized for the entire duration of the call. Accordingly, if only one loop was provided and was utilized for serving such a call, the operator would be idle and would have no functions to perform for the duration of the call after she had completed the services required of her in connection with the establishment of that call. By providing the four loops, a call can be offered to any idle loop while another loop in the same group is being utilized on another call for which the operator has completed the active servicing thereof. To facilitate the serving of such a call on an idle or unused loop, the loop access control circuit, such as circuit LAC of FIG. 1, changes the busy condition on the position link appearances of the unused loops to the idle condition after the operator completes the active servicing of a call. Thus, the serving of the 264 position loops from the position link connectors PL0–PL9 and CPL by 66 operator positions enables a plurality of incoming calls to be extended to and served by a plurality of operators with a minimum of waiting time between calls.

DETAILED DESCRIPTION

Referring now to FIGS. 2–6, a detailed description will be presented of the circuit operations involved in providing for the connection of incoming special service and CAMA calls to an operator position. This description is directed only to those circuit details necessary for a clear understanding of the present invention. Other circuit details necessary to integrate the present invention into an operating tandem system are disclosed in Curtis. Accordingly, FIGS. 2–6 show only the structural details of one position control circuit and the control leads over which the latter circuit is interconnected with the position links PL0–PL9, CAMA position link CPL, position circuit PC1, data transfer circuit DT, and traffic regulator TR.

Figure 3:
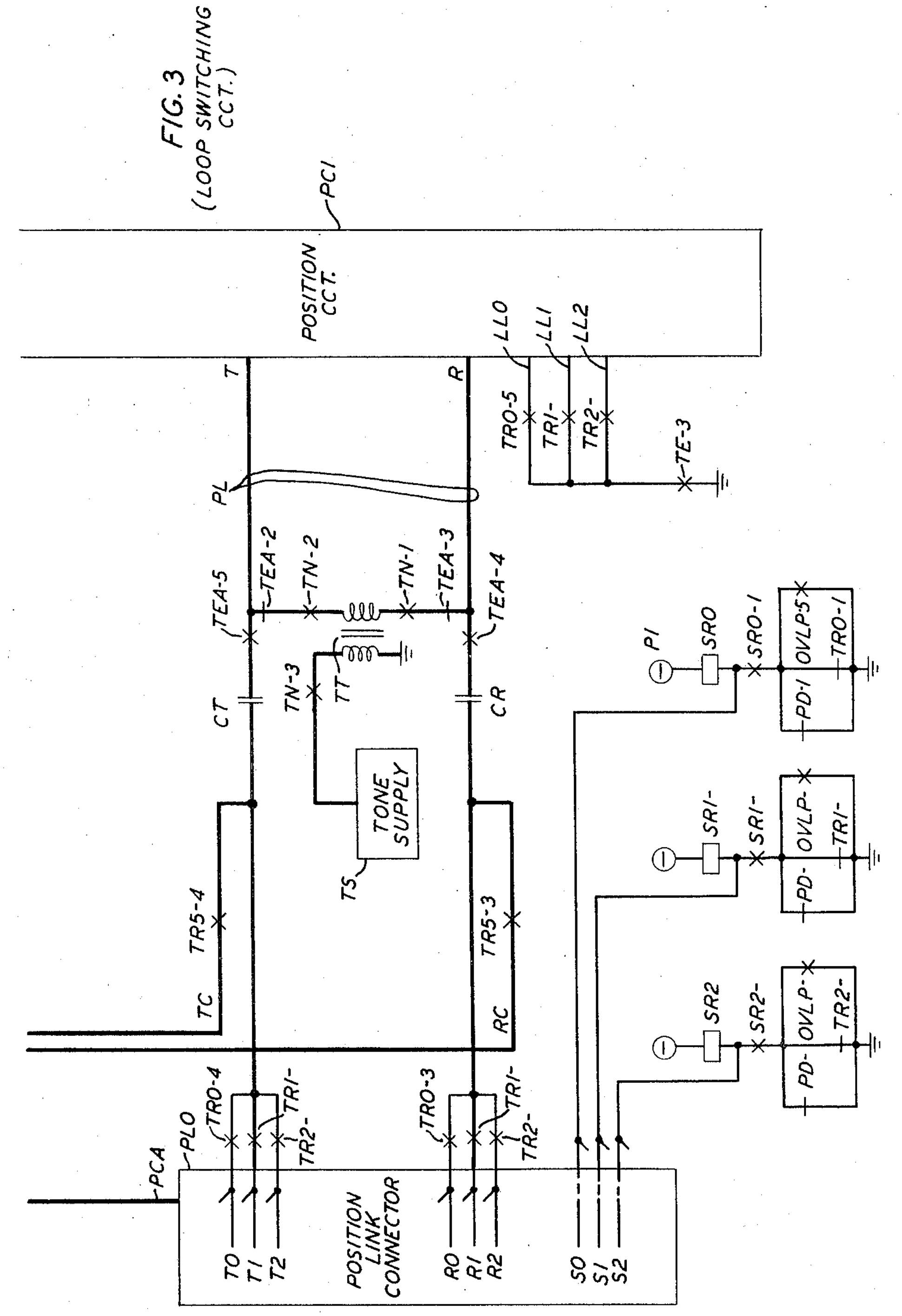

In FIG. 3, it may be noted that there are three position loops extending from position link PL0. These loops each comprise tip, ring and sleeve leads; for example, loop L0 comprises the leads T0, R0 and S0. As is described in Curtis, when a special service call is to be connected through a position link, for example link PL0, and an operator position, for example position OP1 of FIG. 2, has been selected for serving that call, link PL0 applies a ground potential to the sleeve lead of an available one of the three loops L0–L2 to the position control circuit PCC1 to effect the operation of the associated one of the sleeve relays SR0–SR2 in the loop switching circuit LSC of FIG. 3. Let it be assumed now for ease of understanding that loop L0 has been selected for serving the special service call and, accordingly, that ground has been applied to the sleeve lead S0 of FIG. 3 to complete the circuit through the winding of relay SR0 to the negative potential P1 for operating relay SR0. Upon operating, relay SR0 completes a locking path for itself via contacts SR0–1 and PD–1 to ground. The latter ground is also extended to the sleeve lead S0 for holding the call connections through link PL0.

Figure 4:
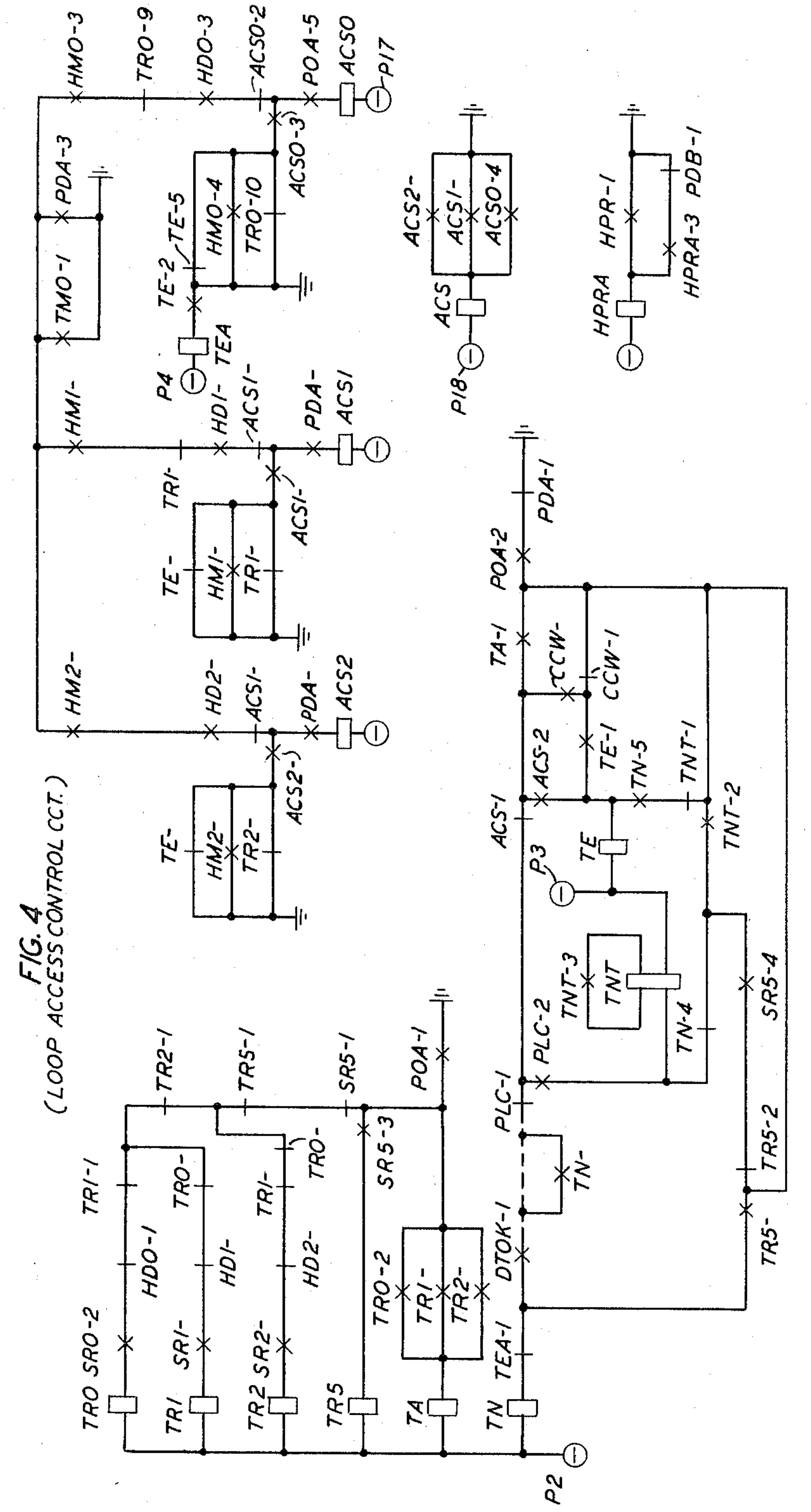

The operation of relay SR0 causes the operation of the associated talk relay TR0 of FIG. 4 over the path from the negative potential P2 through the TR0 relay winding and the contacts SR0–2, HD0–1, TR1–1, TR2–1, TR5–1, SR5–1 and POA–1 to ground. The latter contact POA–1 is controlled by the relay POA (not shown herein but shown on FIG. 167 of Curtis) which is operated whenever the operator telephone is connected into the position OP1. When operated, relay TR0 operates the talk auxiliary relay TA of FIG. 4 over the path from potential P2 through the TA relay winding and contacts TR0–2 and POA–1 to ground. Operated relay TR0 also closes its contacts TR0–3 and TR0–4 in FIG. 3 to partially complete paths for interconnecting the tip and ring talking leads T0 and R0 of loop L0 to the position circuit PC1.

Before describing the circuit operations that follow after relay TA operates, it is advisable to note that when the position link PL0 initially is connected to the position control circuit PCC1, it activates the relay PLC of FIG. 2 by applying a negative potential (not shown) to lead PCA as described in Curtis to indicate that position link connector is to connect an incoming call to circuit PCC1.

Figures 1, 7:
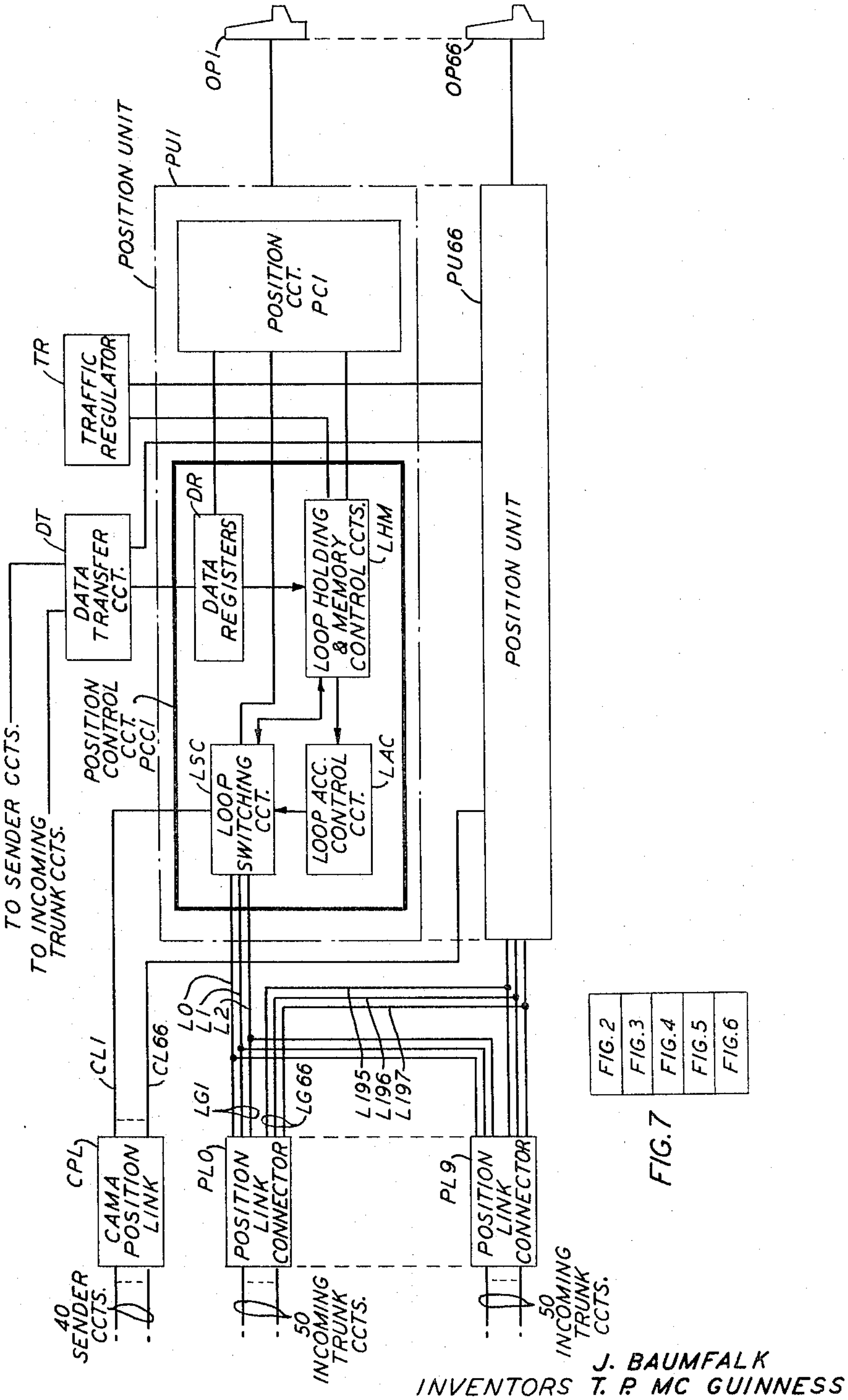

After the position link PL0 has connected the call to the loop L0 as explained, relay PLC is released. The latter relay then cooperates with other relays (not shown) to activate the data transfer circuit DT of FIG. 1 for gathering data concerning the call being served on loop L0 from the various common control circuits (not shown) and the incoming trunk circuit (not shown) of the tandem system.

When relay TA of FIG. 4 operates, it causes the operation of the tone timer relay TNT of FIG. 4 over the path from the negative potential P3 through the TNT relay lower winding and the contacts PLC–2, ACS–1, TA–1, POA–2 and PDA–1 to ground. Upon operating, relay TNT locks via the contacts TN–4, TNT–2, POA–2 and PDA–1 to ground. Operated relay TNT also closes its contact TNT–3 to shunt its upper winding thereby making the relay a slow releasing device. This relay is utilized for controlling the duration of the alerting tone to be supplied to position OP1 as later explained.

As is described in Curtis, after the data concerning the call on the loop L0 has been gathered, it is transferred through the data transfer circuit DT to the data registers DR in the position control circuit PCC1 of FIG. 2 and is made available via the contacts OVLP–5 to OVLP–34, display leads DL1–DL30 and the position circuit PC1 for activating circuitry (not shown) at position OP1 which displays a portion of it automatically and the remaining portion at the operator's request. After this call data has been satisfactorily registered, the data transfer okay relay DTOK (not shown herein but shown in FIG. 182 of Curtis) in the position control circuit PCC1 is operated as described in Curtis. The operation of relay DTOK (not shown) in conjunction with the relay PLC released and relay TA being operated at this time completes a path for operating the tone relay TN of FIG. 4. The latter path is from potential P2 through the TN relay winding and contacts TEA–1, DTOK–1, PLC–1, ACS–1, TA–1, POA–2 and PDA–1 to ground. The operation of relay TN causes an alerting tone to be supplied to the operator position OP1 over the path from position OP1 of FIG. 2 through position circuit PC1 into FIG. 3, leads T and R of the position loop PL, contacts TEA–2, TEA–3, TN–1 and TN–2, the windings of the tone transformer TT and contact TN–3 to the tone supply TS. The tone remains applied to the described path for a predetermined interval to inform the operator that a call is awaiting service. The timed interval is controlled by the relay TNT, TEA and TE of FIG. 4.

After relay TN operates, it causes the slow release of relay TNT by opening its locking path at contact TN–4. The release of relay TNT causes the operation of relay TE of FIG. 4 over the path from potential P3 through the TE relay winding and the contacts TN–5, TNT–1, POA–2 and PDA–1 to ground. Upon operating, relay TE locks via contacts TE–1, CCW–1, POA–2 and PDA–1 to ground. The operation of relay TE also applies ground in FIG. 3 through contacts TE–3 and TR0–5 and lead LL0 to the position circuit PC1 to effect the lighting of a loop access lamp (not shown) for loop L0 at position OP1 in a manner as set forth in Curtis. Relay TE also operates the relay TEA of FIG. 4 over the path from the negative potential P4 through the TEA relay winding and contact TE–2 to ground. After the operation of the relay TEA, the tone is disconnected from the position loop PL of FIG. 3 at the contacts TEA–2 and TEA–3. At approximately the same time as the latter operation is taking place, the operation of relay TEA completes the talking connection from position OP1 of FIG. 2 through the position circuit PC1 into FIG. 3, leads T and R of the position loop PL, contacts TEA–4 and TEA–5, capacitors CT and CR, and contacts TR0–3 and TR0–4 to the position loop L0.

The receipt of the alerting tone by the operator and the lighting of the loop access lamp signal the operator that a special service call has been connected to her position. The operator may then proceed to complete the functions required for serving the call as described in detail in Curtis.

*Operator encounters a delay in completing the call.*—In the event that the operator encounters a delay in completing the special service call which has been extended over loop L0 to position OP1, she may decide to serve a short work-time CAMA call on an overlap basis. The reasons for the delay on the special service call may have been occasioned by, for example the unavailability of the desired called party on a person-to-person call. The called party is often found to be away from the phone in another part of the home or business office when a person-to-person call is received for him; hence there is a delay before he reaches the phone. When such a delay is encountered, the operator may view a CAMA calls-waiting lamp (not shown) at her position, which lamp provides a visual indication that there are such calls now awaiting service. The lighting of this lamp is controlled by the traffic regulator TR of FIG. 1 in a manner as set forth in Germanton.

If there are no CAMA calls awaiting service at this time, the operator may remain engaged with the special service call on the position loop L0. On the other hand, however, if there are CAMA calls now awaiting service, the operator may initiate the request for the admittance of one CAMA call from the CAMA position link CPL to the position OP1 by momentarily depressing a CAMA-CW key (not shown) at the position OP1. The operation of this key will extend a ground over the lead CCWL of FIG. 2 to complete the circuit through the contact OVLP-1 and the CCW relay winding to the negative potential P5 for operating relay CCW.

The operation of relay CCW will result in the operation of the overlap relay OVLP of FIG. 2 over the path through contact CCW-2 and the OVLP relay winding to the negative potential P6. Upon operating, relay OVLP closes its locking path through contacts TA-2 and OVLP-2 to ground. At the same time, relay OVLP closes an auxiliary locking path for relay SR0 of FIG. 3. This latter path is through the contacts SR0-1 and OVLP-5 to ground. The ground extended over the latter path is also applied to lead S0 of loop L0 for holding the call connections to the calling party. When operated, relay OVLP activates its contact OVLP-3 to complete a locking path for relay CCW through contacts CCW-3, PLC-3, PDA-2 and TM0-1 to ground. Operated relay OVLP also activates its contacts OVLP-5 and OVLP-34 to open the display leads DL1-D30 extending between the data registers DR and the display circuit (not shown) at the operator position OP1 via the position circuit PC1. The display at the position OP1 is then extinguished in order to prevent the possibility of its confusing the operator when the CAMA call is connected to her position.

The operation of relay CCW also closes its contact CCW-9 to activate the timer TM of FIG. 2. This timer is utilized for generating a timed interval within which a CAMA call must be connected to position OP1. If, as hereinafter described, a CAMA call is not connected to position OP1 within the prescribed interval the timer will activate the timer relay TM0 to initiate the reconnection of the position OP1 with the loop L0 of FIG. 3.

After relay CCW has operated, it disconnects the negative potential P7 of FIG. 6 from the GB lead chain circuit extending to the traffic regulator TR to inform the regulator TR that there is at least one operator position idle and offering to serve a CAMA call in the group of operator positions comprising position OP1. After this potential has been disconnected, regulator TR is activated in a manner as disclosed in Germanton to signal the CAMA position link CPL of FIG. 2 that at least one operator position in the position group comprising the position OP1 is available to serve a CAMA call. Upon receiving such a signal, link CPL may be activated in a manner as set forth in the cited Breed et al. patent to extend one CAMA call to the CAMA loop CL1 of FIG. 2.

Upon operating, relay CCW causes the release of relay TE of FIG. 4 by opening its locking path at contact CCW-1. Released relay TE in turn causes the release of relay TEA of FIG. 4 by opening contact TE-2. The position loop PL is then disconnected from the loop L0 at contacts TEA-4 and TEA-5. In addition, the loop access lamp (not shown) used at position OP1 for the loop L0 is extinguished under the control of contact TE-3 of FIG. 3.

Figure 5:
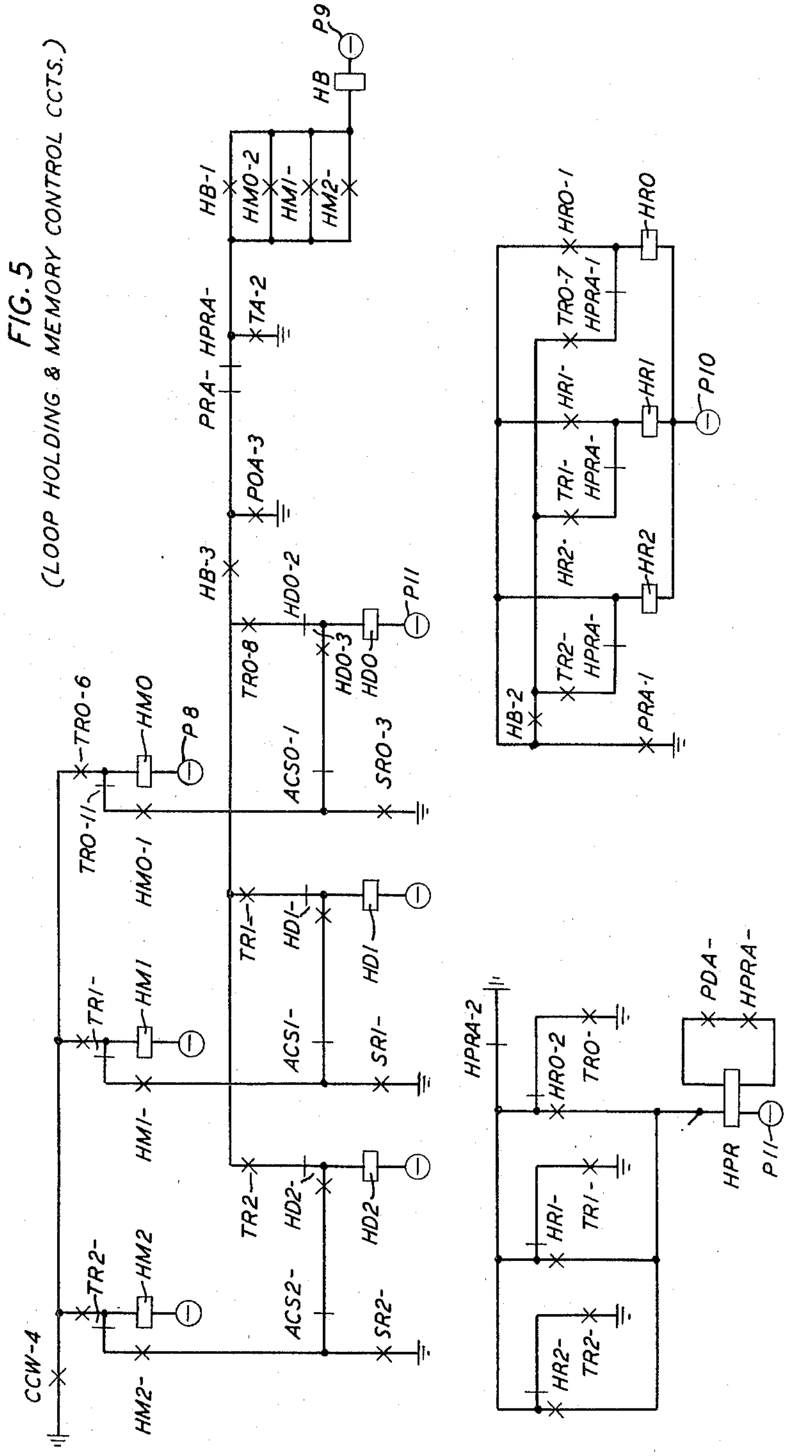

Operated relay CCW also initiates a series of circuit actions whereby the identity of the position loop L0 of FIG. 3 is registered in the memory control circuits LHM (FIG. 5) of the position control circuit PCC1. Before describing how this registration is effected, it is advisable to explain that this memory circuit comprises an individual one of the hold memory relays HM0-HM2 for each of the three loops L0-L2 extending between the position link PL0 and the position control circuit PCC1. Referring to FIG. 5, it may be seen that the particular one of the relays HM0-HM2, which is operated when the CCW relay is operated, is controlled by one of the relays TR0-TR2, which relay is associated with the loop serving the special service call whose completion has been delayed. Since it has previously been assumed that the TR0 relay has been operated as a result of the call on the loop L0, relay HM0 of FIG. 5 will be operated by relay CCW over the path from the negative potential P8 through the HM0 relay winding and the contacts TR0-6 and CCW-4 to ground. Operated relay HM0 closes a locking path for itself through the contacts TR0-11, HM0-1 and SR0-3.

The operation of relay HM0 also effects the operation of relay HB of FIG. 5 over the path from the negative potential P9 through the HB relay winding and the contacts HM0-2 and TA-2 to ground. In operating, relay HB closes a locking path for itself through contacts HB-1 and TA-2 to ground. When relay HB operates, it initiates a series of circuit operations which result in the release of the position group relay PGT (not shown in the present drawing but shown in FIG. 163 of Curtis). When the latter relay releases, it makes the position loops L0-L2 appear busy to the links PL0-PL9 so that these links will not attempt to extend special service calls to these loops after the CAMA call request has been initiated by the operator.

If the data registers DR of FIG. 2 are activated for storing call data for the special service call on loop L0, the position register attached relay PRA (not shown in the present drawing but shown in FIG. 181 of Curtis) will be operated at the time relay HB operates. Accordingly, when relay HB operates, it causes the operation of the hold register relay HR0 of FIG. 5 over the path from the negative potential P10 through the HR0 relay winding and the contacts HPRA-1, TR0-7, HB-2 and PRA-1 to ground. After operating, relay HR0 locks through the contacts HR0-1 and PRA-1 to ground. Relay HR0 also effects the operation of the hold position registers relay HPR of FIG. 5 over the path of the negative potential P11 through the left-hand winding of relay HPR and the contacts HR0-2 and HPRA-2 to ground. The HPR relay in turn operates the auxiliary relay HPRA of FIG. 4 over the obvious path through contact HPR-1 and, upon operating, relay HPR locks through contacts HPRA-3 and PDB-1 to ground. Relay HPRA then causes the release of HPR by opening contact HPRA-2. With the HPRA relay operated, the position registers (not shown) at position OP1 are placed in the hold conditon for maintaining the storage of the data concerning the call on loop L0. These latter registers are utilized for storing call data key-pulsed by the operator at position OP1.

When relay HP operates as previously explained, it causes the operation of the position busy relay PBA of FIG. 6 over the path from the negative potential P13 through the PBA relay winding and the contacts HB-4, POA-4 and OVLP-4. Upon operating, relay PBA closes its contacts PBA–1 in parallel with contact HB–4 to lock itself operated.

After relay HB operated, it completes a circuit for operating relay HD0 of FIG. 5 to initiate circuit actions which result in the disconnection of the tip and ring leads T0 and R0 of loop L0 from the tip and ring leads T and R of the position loop PL, and the connection of the latter leads to the tip and ring leads TC and RC of the CAMA loop CL1 of FIG. 2. This action is started when relay HB completes the circuit in FIG. 5 from the negative potential P11 through the winding of the disconnect relay HD0 and the contacts HD0–2 and TR0–3 and the contacts HB–3 and POA–3 to ground. Upon operating, relay HD0 locks over the path through the contacts HD0–3, ACS0–1 and SR0–3 to ground.

In operating, relay HD0 opens the operate path of the TR0 relay of FIG. 4 at contact HD0–1 and relay TR0 releases. The release action of relay TR0 opens the contacts TR0–3 and TR0–4 to disconnect loop L0 from the leads T and R of the position loop PL. Relay TR0 then also effects the release of the TA relay of FIG. 4 by opening contact TR0–2. When relay TA releases, it opens its contact TA–2 to effect the release of relay HB.

The disconnect relays HD1 and HD2 of FIG. 5 are individually associated with the loops L1 and L2, respectively, for performing essentially the same functions as relay HD0.

Pausing briefly now to recapitulate the circuit actions which have occurred, it may be recalled that the operator, upon recognizing that a delay has been encountered, activated a key (not shown) at position OP1 to effect the registration of the identity of the loop L0 on the hold memory relay HM0. In addition, the operation of the overlap relay OVLP effected the disconnection of the data registers DR from the display circuits (not shown) at position OP1 while the registers DR were being held activated to store the data for the special service call being held on the loop L0. Also, the activation of the HB relay resulted in the making of the loops L0–L2 appear busy to the position links PL0–PL9. Finally, the talk relay TR0 of FIG. 4 was released to disconnect the loop L0 from the position loop PL to the position OP1. The position control circuit PCC1 is now prepared for receiving a CAMA call over the leads TC and RC of the CAMA position loop CL1 of FIG. 2.

*CAMA call extended from the CAMA position link to the operator position.*—When the negative potential P7 was disconnected from the GB lead of FIG. 6, as previously explained, the traffic regulator TR signals the CAMA position link CPL its controller (not shown) to connect a CAMA call to the CAMA loop CL1. The manner in which these connections are extended to loop CL1 is disclosed in the cited Breed et al. patent. When the call has been extended to the loop CL1, the CAMA position link CPL will activate the PLC relay in the position control circuit of FIG. 2 by applying negative potential (not shown) to the PCB lead to complete the circuit through the winding of relay PLC to ground. Upon operating, relay PLC opens the locking path for the relay CCW of FIG. 2 at contact PLC–3, and thereby causes the release of relay CCW.

After the PLC relay has been operated, link CPL will cause the operation of relay SR5 of FIG. 2 by applying ground to lead S5 and thereby completing the path through contact PLC–4 and the winding of relay SR5 to the negative potential P13. The operation of relay SR5 completes the path in FIG. 6 for reapplying the negative potential P7 through the contacts SR5–2 and CCW–2 and the intermediate and last position control circuits in the same position group to the GB lead extending to the traffic regulator TR so that the regulator TR may inform the CAMA link CPL in a manner as disclosed in Germanton that the operator position OP1 is no longer idle. After link CPL has initially operated relay SR5 over the previously described path, it applies a ground to the sleeve lead S to hold the relay SR5 operated for the remainder of the CAMA call.

When relay SR5 is operated, it completes a path for operating the relay TNT over the path extending from the negative potential P3 through the lower winding of relay TNT and the contacts TN–4, SR5–4, TR5–2, POA–2 and PDA–1 to ground. Upon operating, relay TNT locks through contacts TN–4, TNT–2, POA–2 and PDA–1 to ground. At the same time, it activates contact TNT–3 to shunt its upper winding and thereby cause relay TNT to act as a slow release device.

The operation of relay SR5 also causes the operation of the talk relay TR5 of FIG. 4 over the path from potential P2 through the TR5 relay winding and contacts SR5–3 and POA–1 to ground. Operated relay TR5 in turn completes a path for operating the tone relay TN of FIG. 4 over the path from the potential P2 through the TN relay winding and the contacts TR5–3, POA–2 and PDA–1 to ground. In operating, the tone relay completes the previously described path in FIG. 3 for connecting the tone generated by the tone supply TS to the position loop PL extending to the operator telephone circuit (not shown) at the position OP1 of FIG. 2.

Upon operating, relay TN opens the locking path for relay TNT at contact TN–4 and relay TNT slowly releases. The release of relay TNT causes the operation of relay TE over the path from the potential P3 through the TE relay winding and the contacts TN–5, TNT–1, POA–2 and PDA–1 to ground. The operation of relay TE, in turn, operates its auxiliary relay TEA over the path from the potential P4 through the TEA relay winding and contact TE–2 to ground. The TEA relay in operating transfers the tip and ring leads T and R of the position loop PL from the tone supply to the tip and ring leads TC and RC of the CAMA position loop CL1. This transfer is effected by the contacts TEA–2 through TEA–5 of FIG. 3. The tip and ring leads TC and RC will then be extended from the CAMA position link through the contacts TR5–3 and TR5–4, the capacitors CT and CR, contacts TEA–4 and TEA–5, leads T and R of the position loop PL, and the position circuit PC1 to position OP1.

In FIG. 2, it will be noted that the upper winding of relay OS5 is serially connected to the leads TC and RC of the CAMA loop through the contacts SR5–5, PR–2, and POA–4, the windings of the transformer OST and the contacts TEA–6 and TEA–7 to hold the call connections through the CAMA position link. Relay OS5 is operated over the last-described path to cause the operation of the auxiliary relay OS5A of FIG. 2 over the path from the negative potential P14 through the OS5A relay winding and the contacts OS5–1 and TN–6 to ground. In turn, relay OS5A causes the operation of relay OS5B of FIG. 2 over the path from the negative potential P15 through the OS5B relay winding and contact OS5A–1 to ground. Upon operating the OS5B locks through the contacts TR5–5 and OS5B–2 to ground. The TR5–5 contact also extends ground to the lead CAMA in FIG. 2 to operate the CAMA relay in position circuit PC1 which relay is not shown herein but is shown in FIG. 216 of Curtis. The latter relay is then effective to light the CAMA lamp and to connect the leads KPT and KPR of FIG. 2 from link CPL through the contacts TR5–6 and TR5–7 and position circuit PC1 to position OP1. This latter path is utilized by the operator for key pulsing the calling party number into the sender (not shown) in a manner as described in the aforesaid Breed et al. patent.

In FIG. 2, it may be noted that the KPT and KPR leads are short circuited by the shorting contacts TE–4 and TNT–4, respectively, to prevent the premature keying of the customer number by the operator until such time as the sender (not shown) associated with link CPL is prepared to receive the key pulsing. The shorting of the KPT and KPR leads is removed when the contacts TE–4 and TNT–4 are opened when their associated relays are activated as previously described.

After the CAMA loop CL1 of FIG. 2 has been extended to position OP1, as described, the operator telephone circuit (not shown) at position OP1 will be connected through that loop for serving the call. The operator will then proceed to obtain the calling telephone number from the caller and thereafter proceed to key that number into the associated sender (not shown) over the KPT and KPR leads through the link CPL, as explained in the Breed et al. patent.

*Reconnecting the special service call to the operator position.*—When the operator at position OP1 has completed the keying of the called number, the associated sender (not shown) will send a signal to link CPL that it has satisfactorily registered that number, and, as a result, the grounds on leads S and S5 are removed by link CPL for causing the release of the relay SR5.

The release action of relay SR5 opens the operate path for relay TR5 of FIG. 4 at contact SR5–3 and relay TR5 releases. Upon releasing, relay TR5 causes the CAMA lamp (not shown) at position OP1 to be extinguished.

Released relay SR5 also causes the operation of the position release relay PR of FIG. 6 over the path from the negative potential P16 through the PR relay winding and the contacts SR5–6 and TEA–8 to ground. The operation of relay PR bridges the contact PR–2 in parallel with the contact SR5–6 to provide a locking path for the relay PR. The operation of relay PR will operate the position disconnect auxiliary relay PDA of FIG. 6 over the obvious path. When operated, relay PDA also opens the locking path for relay TE of FIG. 4 at contact PDA–1 to release relay TE. In turn, relay TE effects the release of relay TEA by opening contact TE–2. Released relay TEA effects the release of relay PR of FIG. 6 by opening contact TEA–8. Upon releasing, relay PR opens the operate path for relay PDA to effect its release.

The release of relay TEA also opens contacts TEA–6 and TEA–7 to disconnect the CAMA loop CL1 from the upper winding of relay OS5 and thereby effect the release of relay OS5 and the call connections through link CPL to the associated sender (not shown). Relay OS5 then causes the release of relay OS5A by opening contact OS5–1. The latter relay then effects the release of relay OS5B and the CAMA relay (not shown) in position circuit PC1 by opening contact OS5A–1. As a consequence of the latter operation, link CPL and its associated circuitry in the position control circuit PCC1 are released to disconnect link CPL from position OP1.

The previously described momentary operation of the position disconnect relay PDA initiates a series of circuit operations which will transfer the connection between the position loop PL of FIG. 3 from the CAMA loop CL1 to the loop L0 extending to link PL0. This action is started when relay PDA completes an operating circuit for the access relay ACS0 of FIG. 4. The latter path is from the negative potential P17 through the ACS0 relay winding and the contacts POA–5, ACS0–2, HD0–3, TR0–9, HM0–3, and PDA–3 to ground. After relay ACS0 is operated, it locks through contact ACS0–3 and the contacts TR0–10, HM0–4, and TE–5 in parallel to ground. Upon operating, relay ACS0 operates the relay ACS of FIG. 4 over the path from the negative potential P18 through the ACS relay winding and contact ACS0–4 to ground.

It may be noted that the loop access control circuit of FIG. 4 comprises an individual access relay for each of the loops L0–L2. These relays are designated ACS0–ACS2. One of these relays is activated under control of the position disconnect relay PDA and the particular one chosen for operation by the PDA relay is controlled by the hold memory relays HM0–HM2, one of which will have been operated, as explained, at the time that the operator initiated the action for serving a CAMA call on an overlap basis. In the instant case, the ACS0 relay is operated because the hold memory relay HM0 has been previously operated in connection with the special service call now being held on loop L0.

Before describing further circuit operations which occur after relay ACS0 has been operated, it is advisable at this point to explain the functions of the timer TM of FIG. 2. This timer is shown in block diagram form because such a device is well-known in the art and may be similar to the timer TM shown in FIG. 171 of Curtis. Timer TM of FIG. 2 is activated, as previously described, under control of the relay CCW of FIG. 2 to generate a timed interval within which a CAMA call must be connected to position OP1. In the event that such a call has connected to position OP1, the timer TM is deactivated by the contact CCW–9 when relay CCW released as hereinbefore described. On the other hand, if the CAMA call had not been so connected within this interval, the timer will effect the operation of the relay TM0 of FIG. 2 to initiate circuit actions for transferring loop PL from the CAMA loop CL1 to loop L0. This circuit action insures that the servicing of the call on loop L0 is not unreasonably delayed due to a trouble condition in the circuits used for serving CAMA calls. Upon operating, relay TM0 would cause the operation of relay ACS0 of FIG. 4 over the path from potential P17 through the ACS0 relay winding and the contacts POA–5, ACS0–2, HD0–3, TR0–9, HM0–3 and TM0–1 to ground. After operating, relay ACS0 would then complete its previously traced locking path and, as well, operate relay ACS, as described.

The operation of relay ACS0 under the control of either relay PDA or TM0 opens the locking path for relay HD0 of FIG. 5 at contact ACS0–1 and thereby effects the release of relay HD0. Released relay HD0 will reoperate the relay TR0 of FIG. 4 over the path from the potential P2 through the TR0 relay winding and the contacts SR0–2, HD0–1, TR1–1, TR2–1, TR5–1, SR5–1, and POA–1 to ground. The operation of relay TR0 will in turn effect the release of relay HM0 by opening contact TR0–11 of FIG. 5.

After relay TR0 of FIG. 4 has reoperated, it in turn reoperated relay TA of FIG. 4 over the obvious operate path through contact TR0–2. Operated relay TA then opens the locking path for the overlap relay OVLP of FIG. 2 at contact TA–2. Upon releasing, relay OVLP effects the release of relay PBA of FIG. 6 by opening contact OVLP–4. At the same time, relay OVLP recloses contacts OVLP–5 through OVLP–34 to reconnect the data registers DR over leads DL1–DL30 to the display circuits (not shown) at position OP1.

When relay TA operates, it reoperates the TE relay of FIG. 4 over the path from potential P3 through the TE relay winding and contacts ACS–2, TA–1, POA–2, and PDA–1 to ground. Relay TE locks through contacts TE–1, CCW–1, POA–2, and PDA–1 to ground. The operation of relay TE also operates relay TEA over the obvious path through contact TE–2. At the same time, relay TE opens the last locking path for relay ACS0 at contact TE–5. Relay ACS0 then releases and in turn releases relay ACS by opening contact ACS0–4.

After relay TEA operates, it re-establishes the connection from the operator position OP1 to loop L0 extending from the position link PL0 over the path extending through the position circuit PC1, the leads T and R of the position loop PL, contacts TEA–4 and TEA–5, capacitors CT and CR and the contacts TR0–3 and TR0–4. As a consequence, the telephone operator circuit (not shown) at the position OP1 is again bridged to loop L0 for serving the special service call which has been delayed. The operator may then attempt to complete the required call functions for the special service call as described in Curtis.

In the event that the special service call is yet to be delayed for some reason, the operator may decide to serve another CAMA call. She may do so by reoperating the CAMA–CW calls key-waiting key at her position to cause another such call to be extended to her position in essentially the same manner as previously explained.

It is to be understood that the hereinbefore described arrangements are illustrative of the principles of our invention. In light of this teaching, it is apparent that numerous other arrangements may be devised by those skilled in the art without departing from the spirit and scope of the invention.

What is claimed is:

1. In combination, first, intermediate and last communication channels, an operator position, connector means responsive to the receipt of a service request on any one of said channels for connecting said one channel to said position, applying means responsive to the receipt of a signal from said position for applying a hold condition to said one channel, means operated by said applying means for temporarily transferring the connection of said position from said held channel to another of said channels having a service request thereon, and means automatically activated after said request on said other channel has been served for releasing said transferring means to reconnect said held channel to said position.

2. In combination, first, intermediate and last communication channels, an operator position, connector means responsive to the receipt of a service request on any one of said channels for connecting said one channel to said position, applying means responsive to the receipt of a signal from said position for applying a hold condition to said one channel, means activated by said applying means for registering the identity of said held channel, means operated by said registering means for disconnecting said held channel from said position, means controlled by said applying means for enabling said connector means to respond to another service request on another of said channels and to connect said other channel to said position, and means in said connector means activated by said registering means for automatically reconnecting said held channel to said position after said other request has been served.

3. In combination, a plurality of communication channels, an operator position, connector means responsive to the receipt of a service request on any one of said channels for connecting said one channel to said position, applying means responsive to the receipt of a signal from said position for applying a hold condition to said one channel, means activated by said applying means for registering the identity of said held channel, means operated by said registering means for disconnecting said held channel from said position, another communication channel, means controlled by said applying means and responsive to a service request on said other channel for connecting said other channel to said position, and means in said connector means activated by said registering means for automatically reconnecting said held channel to said position after said request on said other channel has been served.

4. The combination in accordance with claim 3 further comprising timing means activated by said applying means for generating a timed interval, and means controllable by said timing means for activating said reconnecting means automatically to reconnect said held channel to said position at the end of said interval.

5. In a telephone system, a group of communication loops for serving predetermined class-of-call, a special communication loop for serving an additional class-of-call, an operator position, and position control means for selectively coupling any one of said loops to said position for the servicing of any of said classes-of-calls, said control means comprising holding means responsive to a signal from said position for placing a hold condition on any one of said loops in said group coupled to said position, means activated by said holding means for registering the identity of said held loop, means controlled by said registering means for decoupling said held loop from said position, auxiliary means thereafter operated by a call on said special loop for coupling said special loop to said position, means for releasing said auxiliary means to decouple said special loop from said position after said call on said special loop has been served, and means jointly controlled by said registering and decoupling means and responsive to the release of said auxiliary means for automatically again coupling said held loop to said position.

6. Operator position equipment including a plurality of position loops for receiving incoming calls; a position circuit; position control means comprising connector means operable upon the receipt of a call on any one of said loops for connecting said one loop individually to said circuit, applying means responsive to the receipt of a signal from said position for applying a hold condition to said one loop, and memory means activated by said applying means for storing the identity of said held loop, said connector means being releasable upon the activation of said memory means to disconnect said held loop from said circuit; and another position loop for receiving a special service call; said control means further comprising means activated by said applying means for enabling a special call to be received on said other loop, said connector means being operable upon the receipt of said special call for connecting said other loop to said circuit, auxiliary means activated after said special call has been served for releasing said connector means to disconnect said other loop from said circuit, and means therafter jointly controlled by said auxiliary and memory means for automatically operating said connector means again to connect said held loop to said circuit.

7. Operator position equipment in accordance with claim 6 wherein said connector means comprises a plurality of connnector relays, each of said relays being individually associated with one of said loops and operable for connecting said associated loop to said position circuit; a group of control relays, each of said control relays being individually associated with one of said loops and responsive to a call on said associated loop for operating said associated connector relay to connect said associated loop to said circuit.

8. Operator position equipment in accordance with claim 7 wherein each of said loops comprises a pair of speech conductors and a control conductor; further comprising a two-conductor communication channel extending between said position control means and said position circuit, capacitive coupling means and contacts of said connector relays for connecting said speech conductors individually to said channels, and wherein each of said control relays includes a winding individually connected to said control conductor of said associated loop for causing the operation of said last-mentioned relay upon the receipt of a call thereon, and said applying means includes contacts of each of said control relays for applying an electrical signal to said conductors to provide a hold condition to said loops.

9. Operator position equipment in accordance with claim 8 wherein said applying means further includes a key and a relay means, said relay means being operative upon the activation of said key for cooperating with said control relay contacts to apply said electrical condition to said conductors.

10. Operator position equipment in accordance with claim 7 wherein said position control means further comprises means for generating a tone signal, means operable under control of said control relays for coupling said tone signal to said position circuit, means activated by said coupling means for determining the period for which said tone signal is coupled to said circuit, and means activated by said determining means for decoupling said tone signal from said circuit and for cooperating with said connector relays to connect any one of said loops to said circuit.

11. Operator position equipment in accordance with claim 7 wherein said memory means comprises a plurality of memory relays, each of said memory relays being individually associated with one of said plurality of position loops and operative under joint control of said applying means and said connector and control relays associated with said last-mentioned one of said loops for storing the identity of that loop.

12. Operator position equipment in accordance with claim 11 wherein said position control means further comprises disconnect relay means responsive to the operation of any one of said memory relays for releasing the operated connector relay associated with the held loop and thereby causing the disconnection of said held loop from said position circuit.

13. Operator position equipment in accordance with claim 12 wherein said disconnect relay means includes a first relay operative under control of contacts of said memory relays; and a plurality of disconnect relays, each of said disconnect relays individually associated with one of said plurality of loops and operative under joint control of contacts of said first relay and said connector relay associated with the same loop for releasing said last-mentioned relay and thereby causing the disconnection of said last-mentioned loop from said position circuit.

14. Operator position equipment in accordance with claim 13 wherein said position control means further comprises a position disconnect means activated by said control relay associated with said other loop after said special service call has been served for effecting the disconnection of said position circuit from said other loop, an access relay operative under joint control of said position disconnect means and said memory, disconnect and connector relays associated with said held loop for effecting the reoperation of said last-mentioned connector relay and thereby the reconnection of said held loop to said circuit.

15. Operator position equipment in accordance with claim 14 wherein said position control means further comprises timing means activated by said applying means for generating a timed interval within which said special service call is to be received on said other loop, means for deactivating said timing means to cancel further timing after said special call is received on said other loop within said interval, a timer relay activated by said timing means at the end of said interval for cooperting with said memory, disconnect and connector relays associated with said held loop for effecting the reoperation of said last-mentioned connector relay and thereby the reconnection of said held loop to said position circuit.

16. In a telephone system, a plurality of incoming loops, each of said loops including a pair of speech conductors and a control conductor, a first position link connector for connecting calls to said loops, an operator position, a two-lead channel extending from said position, a position control circuit comprising: a plurality of connector relays, each of said relays being individually associated with one of said loops and operable for connecting said speech conductors of said one loop to said channel leads; a group of control relays, each of said control relays having a winding individually connected to said control conductor of one of said loops and being responsive to a calling signal received over said last-mentioned conductor from said link connector for operating said connector relay associated with said last-mentioned loop to prepare said speech conductors of that loop for connection to said leads; means including contacts of said connector relays for enabling only one of said connector relays to be operated at a time; means for generating a tone signal; means including a transformer and a relay operable for coupling said generated tone signal to said leads; an auxiliary relay operated by any operated one of said connector relays for operating said coupling relay; a tone timer relay activated by said coupling relay for determining the time period for which said generated signal is coupled to said leads; and a relay circuit operated by said timer relay for decoupling said tone signal from said leads and for cooperating with the operated one of said connector relays to connect said speech conductors of the calling loop to said leads; an additional incoming loop having a pair of speech conductors and a control conductor, a second position link connector for connecting calls to said additional loop, and said control circuit further comprising overlap call switching means including: overlap relay means responsive to the receipt of an electrical signal from said position for enabling a call to be connected from said second link connector to said additional loop; means including a contact of said overlap relay means for providing an electrical signal to said control conductor of said calling loop to hold the call connections through said first link connector; a memory relay activated by said overlap relay means for storing the identity of the held loop; a disconnect relay activated by said memory relay for releasing said connector relay associated with said held loop to disconnect said speech conductors of said held loop from said leads; timing means activated by said overlap relay means for generating a timed interval within which a call is to be received on said additional loop; another connector relay operable for connecting said speech conductors of said additional loop to said leads; another control relay having a winding connectable to said control conductor of said additional loop and being responsive to a calling signal received over said last-mentioned conductor from said second link connector for operating said other connector relay; means including contacts of said other connector relay for operating said coupling relay for coupling said generated signal to said leads; said tone timer relay being again activated by said coupling relay for determining the time period for which said generated signal is coupled to said leads; said relay circuit being operated by said timer relay for decoupling said generated signal from said leads and for cooperating with said other connector relay to connect said speech conductors of said additional loop to said leads; an access relay associated with said held loop and selectively operable under control of said memory relay for releasing said disconnect relays and thereby to reoperate said connector relay associated with said held loop; said other control relay responsive to the disconnection of said calling signal from said control conductor of said additional loop after said call on said additional loop has been served for selectively operating said access relay; means activated by said timing means for selectively operating said access relay at the end of said timed interval; means including contacts of said other control relay for releasing said other connector relay to disconnect said speech conductors of said additional loop from said leads; means responsive to the operation of said access relay for releasing said disconnect relays; and means activated by said disconnect relays for controlling the operation of said relay circuit and connector relay associated with said held loop whereby said speech conductors of said held loop are automatically reconnected to said leads.

References Cited by the Examiner

UNITED STATES PATENTS

| | | | |
|---|---|---|---|
| 2,519,287 | 8/1950 | Robb et al. | 179—51 |
| 2,881,261 | 4/1959 | Molnar | 179—27.1 |
| 2,922,847 | 1/1960 | Dunning | 179—27.1 |
| 3,133,153 | 5/1964 | Bonanno | 179—27.23 X |

FOREIGN PATENTS

| | | |
|---|---|---|
| 1,130,005 | 3/1962 | Germany. |

KATHLEEN H. CLAFFY, *Primary Examiner.*

L. A. WRIGHT, *Assistant Examiner.*